(12) United States Patent
Poo (10) Patent No.: US 8,795,579 B2
(45) Date of Patent: Aug. 5, 2014

(54) LOCALIZED SHAPING FOR CONTAINER DECORATION

(75) Inventor: Faustino Poo, North Miami, FL (US)

(73) Assignee: Altira, Inc., Miami, FL (US)

( * ) Notice: Subject to any disclaimer, the term of this patent is extended or adjusted under 35 U.S.C. 154(b) by 12 days.

(21) Appl. No.: 13/360,089

(22) Filed: Jan. 27, 2012

(65) Prior Publication Data
US 2013/0193027 A1    Aug. 1, 2013

(51) Int. Cl.
*B29C 49/64* (2006.01)

(52) U.S. Cl.
USPC ............ 264/534; 264/531; 264/529; 264/132

(58) Field of Classification Search
None
See application file for complete search history.

(56) References Cited

U.S. PATENT DOCUMENTS

| | | | |
|---|---|---|---|
| 2,594,290 A * | 4/1952 | Chavannes | 101/171 |
| 4,289,817 A | 9/1981 | Valyi | |
| 4,601,926 A | 7/1986 | Jabarin | |
| 4,603,066 A | 7/1986 | Jabarin | |
| 5,756,038 A * | 5/1998 | Iseli et al. | 264/506 |
| 5,962,096 A | 10/1999 | Smith | |
| 6,488,884 B1 | 12/2002 | Daubenbüchel | |
| 6,554,932 B1 | 4/2003 | Wrobbel | |
| 6,911,266 B1 | 6/2005 | Skov | |
| 7,871,259 B2 | 1/2011 | Linke | |
| 2007/0048473 A1 | 3/2007 | Connolly | |
| 2007/0278236 A1 | 12/2007 | Shen | |
| 2008/0317989 A1 | 12/2008 | Abe | |
| 2010/0203185 A1 | 8/2010 | Litzenberg | |
| 2011/0052747 A1 | 3/2011 | Meinzinger | |

FOREIGN PATENT DOCUMENTS

| | | |
|---|---|---|
| EP | 1029648 B1 | 3/2004 |
| WO | 0107234 A1 | 2/2001 |
| WO | 03061947 A1 | 7/2003 |
| WO | 2008050890 A1 | 5/2008 |

* cited by examiner

*Primary Examiner* — Monica Huson
(74) *Attorney, Agent, or Firm* — Novak Druce Connolly Bove + Quigg LLP (57) ABSTRACT

A process for producing containers includes the steps of providing a container having a shaping region, the shaping region comprising a thermoplastic material; applying an ink to the shaping region; discretely heating the shaping region to a shaping temperature; and discretely shaping the shaping region to take a desired three dimensional shape. A system for producing containers having three dimensional decorations, and containers having three dimensional decorations, are also disclosed.

11 Claims, 9 Drawing Sheets

LOCALIZED SHAPING FOR CONTAINER DECORATION

FIELD OF THE INVENTION

This invention relates generally to container manufacturing processes, and more particularly to container manufacturing processes for producing containers with decorative and/or informative indicia.

BACKGROUND OF THE INVENTION

Containers and particularly polymeric or plastic containers are widely used to package a great variety of consumer goods. Such containers are typically decorated to add to the consumer appeal of the packaged product, as well as for purposes of branding the product with the trademark of the manufacturer or purveyor or providing the consumer with helpful information relating to the product within the container. Graphic decorations are added by several different processes such as screening, spraying and stamping. Often three dimensional decorations in the form of raised or depressed features relative to the major surface of the container are desired, also for purposes of decoration. Such raised or depressed features can be added during the molding process or by subsequent processes such as stamping.

The provision of accurate raised or depressed features which also include accurate graphic decorations has not been previously available. It has been difficult to add graphic designs by screening, spraying or other such methods to three dimensional container surfaces with accurate graphic reproduction of the desired features. For example, in the case of a raised feature depicting the head of a figure, the application of graphic features of the face is difficult to obtain in commercial quantities with sufficient accuracy as to be commercially acceptable. Graphics added after the three dimensional feature is created in a molding step do not apply evenly over the irregular surface.

SUMMARY OF THE INVENTION

A process for producing containers, includes the steps of providing a container having a shaping region, the shaping region comprising a thermoplastic material; applying an ink to the shaping region; discretely heating the shaping region to a shaping temperature; and discretely shaping the shaping region to take a desired three dimensional shape.

The ink can comprise a thermoplastic material. The container can be produced by a first molding process. The shaping step can be a secondary molding process. At least one of the first molding process and the second molding process can be a blow molding process. The shaping step can comprise creating a pressure differential on opposing sides of the shaping region. The shaping step can comprises applying a mechanical force to the shaping region.

The heating step can comprise conductive heating of the shaping region. The heating step can comprise convective heating of the shaping region. The heating step can comprise irradiative heating of the shaping region.

A system for producing containers includes a system for producing a container blank having a shaping region, the shaping region comprising a thermoplastic material; an inking system for applying an ink to the shaping region; a heating system for discrete heating the shaping region; and, a system for discretely shaping the shaping region.

The ink can comprise a thermoplastic material or can be made entirely of thermoplastic materials.

The system for producing a container blank can a blow molding system.

The system for shaping the shaping region can comprise a shaping mold. The system for shaping the shaping region can comprise a blow molding system. The system for shaping the shaping region can comprises a system for creating a pressure differential on opposing sides of the shaping region. The system for shaping the shaping region can comprise a mandrel for applying a mechanical force to the shaping region.

The heating system can comprise a system for conductive heating of the shaping region. The heating system can comprise a system for convective heating of the shaping region. The heating system can comprise a system for irradiative heating of the shaping region.

A container according to the invention can comprise a container body having a shaping region, the shaping region comprising a thermoplastic material and having applied thereto a thermoplastic ink.

BRIEF DESCRIPTION OF THE DRAWINGS

There are shown in the drawings embodiments that are presently preferred, it being understood that the invention is not limited to the arrangements and instrumentalities shown, wherein:

FIG. 12 A-B is a schematic depiction of a three dimensional decoration before (A) and after (B) shaping.

FIG. 13 A-B is a schematic depiction of the application of ink to an unshaped surface as required by the shaped surface.

DETAILED DESCRIPTION OF THE INVENTION

Figure 1:
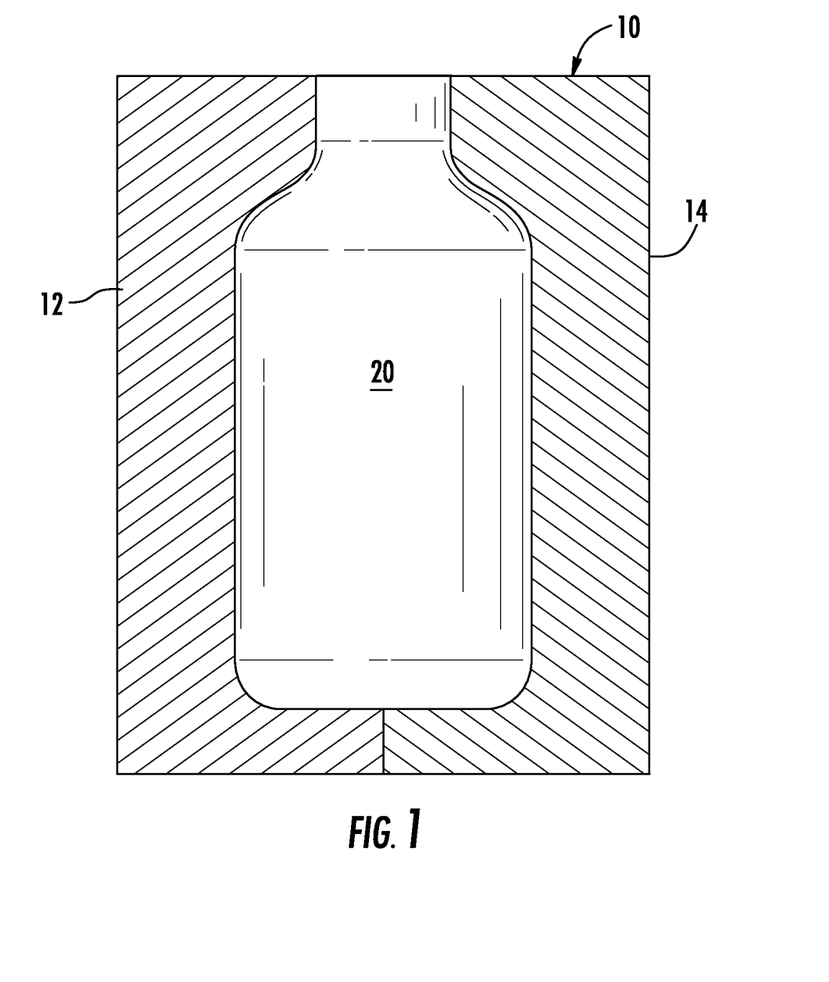
FIG. 1 is a cross section of a container mold for use with embodiments of the invention.

There is shown in FIGS. 1-13 a method and system for creating a localized three dimensional decoration on a container. A mold 10 is shown in FIG. 1. The mold 10 has opposing parts or halves 12, 14 and an open interior mold cavity 20. The mold 10 can take a variety of different forms, sizes, and shapes, can be designed for different molding processes, and can be in two parts, one part, or several parts.

Figure 2:
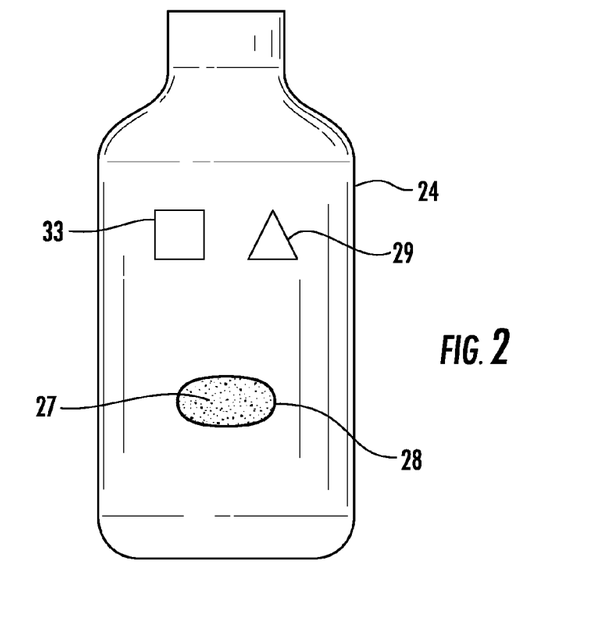
FIG. 2 is a side elevation of a container according to an aspect of the invention.

In FIG. 2 there is shown a container blank 24 according to the invention. The container blank 24 is formed in the mold 10 as by a blow molding process or other suitable molding process. The container 24 can be formed by other container production processes and other types of molds. The container can be of many different materials. The container can be made from a thermoplastic material such as plastic, metal, combinations thereof. Examples of suitable container materials include, but are not limited to, high and low density polyethylenes, polyethylene terephthalate, polyvinyl chloride, polypropylene, polycarbonate, and polystyrene.

The container 24 has a shaping region 28. The shaping region 28 can be at almost any location in the container, and can have different sizes and shapes. The size and shape of the shaping region 28 is dictated by the shape of the three dimensional decoration that is to be created in the subsequent shaping step. The surface area of the shaping region 28 in one aspect covers less than 75% of the total exterior surface area of the container blank, or can be less than 50%, 40%, 30%, 20% or 10%. The shaping region 28 is typically made of the same material as the rest of the container 24. It is also possible that the shaping region 28 can be made from a different material from the rest of the container, or can be coated with a different material. At least the shaping region 28 of the container 24 comprises a thermoplastic material, such that when heated the shaping region 28 can be shaped in a shaping step. Other shaping regions 29, 33 can be provided elsewhere on the container blank and can be shaped in the same step or in subsequent steps. Any number of discrete shaping regions can be provided to permit a multitude of three dimensional decorations to be imparted to a container. It is also possible that the container area around the shaping region 28 can be coated with a different material to assist in the subsequent shaping process, for example by shielding the area around the shaping region 28 from heat or cooling that region to prevent the surrounding area from deforming when the shaping region 28 is shaped.

An ink 27 is then applied to the shaping region 28 corresponding to the decoration that is desired. The ink 27 must be able to expand or stretch without cracking, blistering, or separating when the shaping region 28 is shaped. The ink must also be resistant to the heat that will be applied to soften the shaping region. In one aspect, the ink is a thermoplastic ink. Examples of suitable thermoplastic inks include TF-240 Purple (Polymeric Imaging Inc., 117 East 14th Avenue, N. Kansas City, Mo. 64116).

Figure 12A:
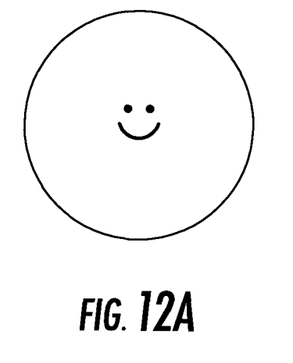
Figure 12B:
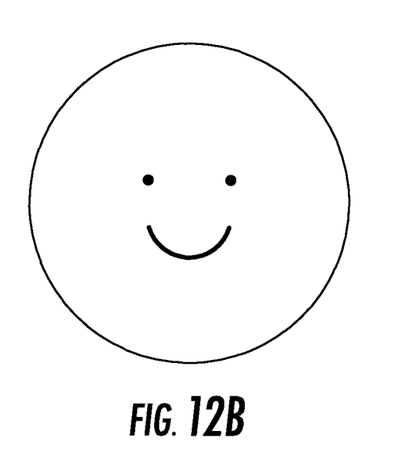
Figure 13A:
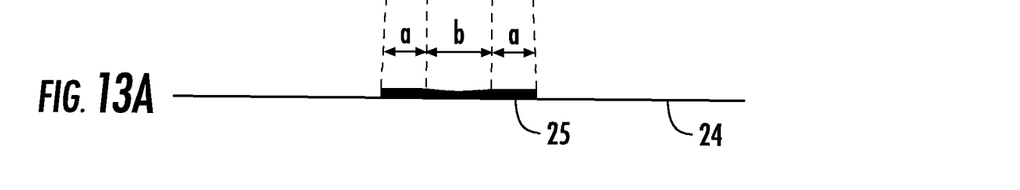
Figure 13B:
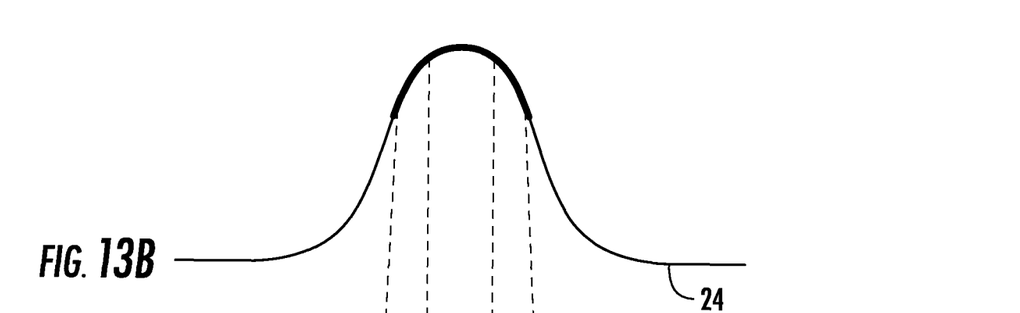

The ink 27 can be applied to the shaping region 28 by any suitable process. Suitable processes include silk screening, ink jet printing, stamping, and pad printing. The ink can be applied uniformly on the unshaped decoration region surface. Alternatively, the ink can be applied to the shaping region in a manner that, when the shaping region stretches during shaping, the ink pattern will be properly positioned in the resulting three dimensional decoration, as shown in FIG. 12 (A) before stretching and FIG. 12 (B) after stretching. In one aspect, the amount of ink can be applied so as to be proportional to the amount of stretch during shaping. This can be accomplished in one example by projecting the three dimensional decoration (FIG. 13 (B)) onto the two dimensional (or otherwise unshaped) surface, and then applying the ink 25 to the unshaped surface proportionally to the projected three dimensional image (FIG. 13 (A)). Areas with more stretching indicated by a-a can have more ink 27 applied to those areas prior to stretching than areas with less stretching indicated by b-b in order for the resulting three dimensional design to have relatively uniform ink coverage. The true length of the three dimensional surface is determined to calculate the degree of distortion, and a proportional amount of ink can be applied to the unshaped surface such that the location and amount of ink is appropriate after shaping.

A suitable software program can be created for the application of the ink over the shaping region, such that when the shaping region expands the ink will evenly coat the shaped surfaces of the resulting three dimensional decoration. There are a number of software programs for determining ink application for containers and packaging which are commercially available. One such software program is "ESKO Studio Software" by EskoArtwork USA, 8535 Gander Creek Drive, Miamisburg, Ohio 45342, http://www.esko.com. The following add-on modules can be added to improve package design functionality: 9646101Y Studio Designer for a 3D preview; 9648298 Studio Toolkit for Labels to create round objects with one or more labels; 9648299 Studio Toolkit for Shrink Sleeves simulates a heat shrink sleeve around one or more objects; and 9646104Y Studio Visualizer to show a variety of substrates, printing and finishing effects. Any suitable software system or package can be used.

Figure 3:
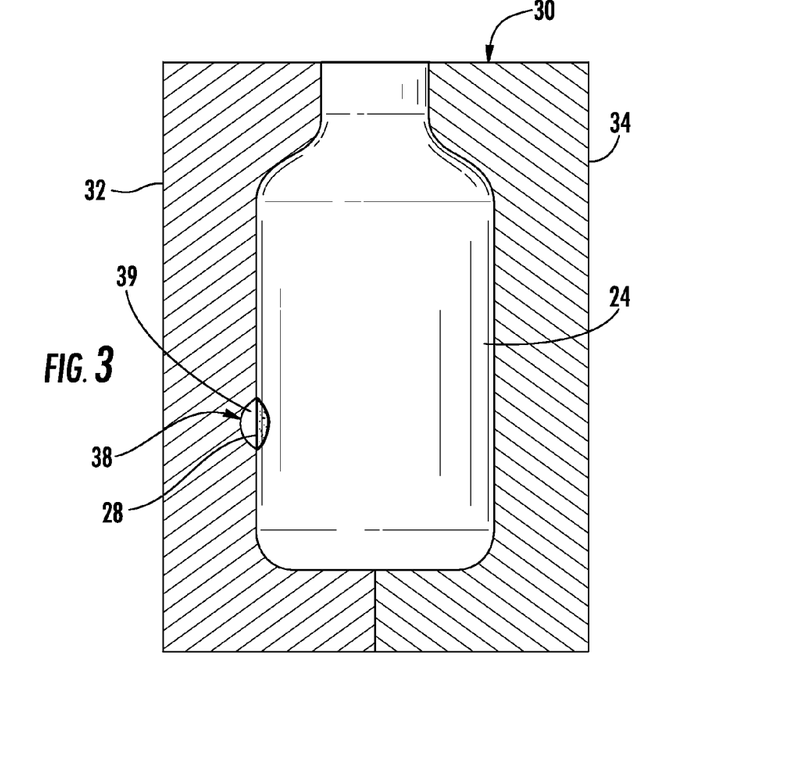
FIG. 3 is a cross section of a shaping mold showing therein a container according to the invention.

The container 24 is then placed into a shaping mold 30, as shown in FIG. 3, for shaping the shaping region 28 into the desired decoration. The shaping mold 30 can have many different sizes and shapes, and can be constructed for different molding processes. In one aspect, the shaping mold 30 is a mold for a blow-molding process and can comprise two parts such as first part 32 and second part 34. The shaping mold 30 can have a cavity surface 38 defining the shaping cavity 39 into which the shaping region 28 will expand. The mold parts 32 and 34 are closed about the container blank 24 prior to the shaping step.

Heat is applied to the shaping region 28 before, during, or throughout the shaping process. The heat must be sufficient to soften the shaping region 28 to be shaped into the desired decoration. The temperature at which a material will soften sufficiently to be shaped is a characteristic of the material. Thermoplastic polymers are elastic and flexible above a glass transition temperature $T_g$. The amount of heat that must be applied to raise the temperature of the shaping region 28 sufficiently to soften can vary. Some of the factors which will determine the amount of heat that should be applied include the composition, surface area, and thickness of the shaping region 28, the depth of the shaping cavity 39 and the corresponding amount of expansion that will be necessary for the shaping region 28 to expand into the shaping cavity 39 until it contacts the shaping cavity surface 38, and the shaping force that will be applied. The heat must not be so great as to damage the surface or composition of the container 24, the shaping region 28, or the ink. The heating is controlled such that it will be discrete to the shaping region and areas of the container surrounding the shaping region will not be heated. The term discrete can mean in one example that more than 90%, 95% or 99% of the heat applied for shaping will be applied only to surfaces of the shaping region 28.

Figure 4:
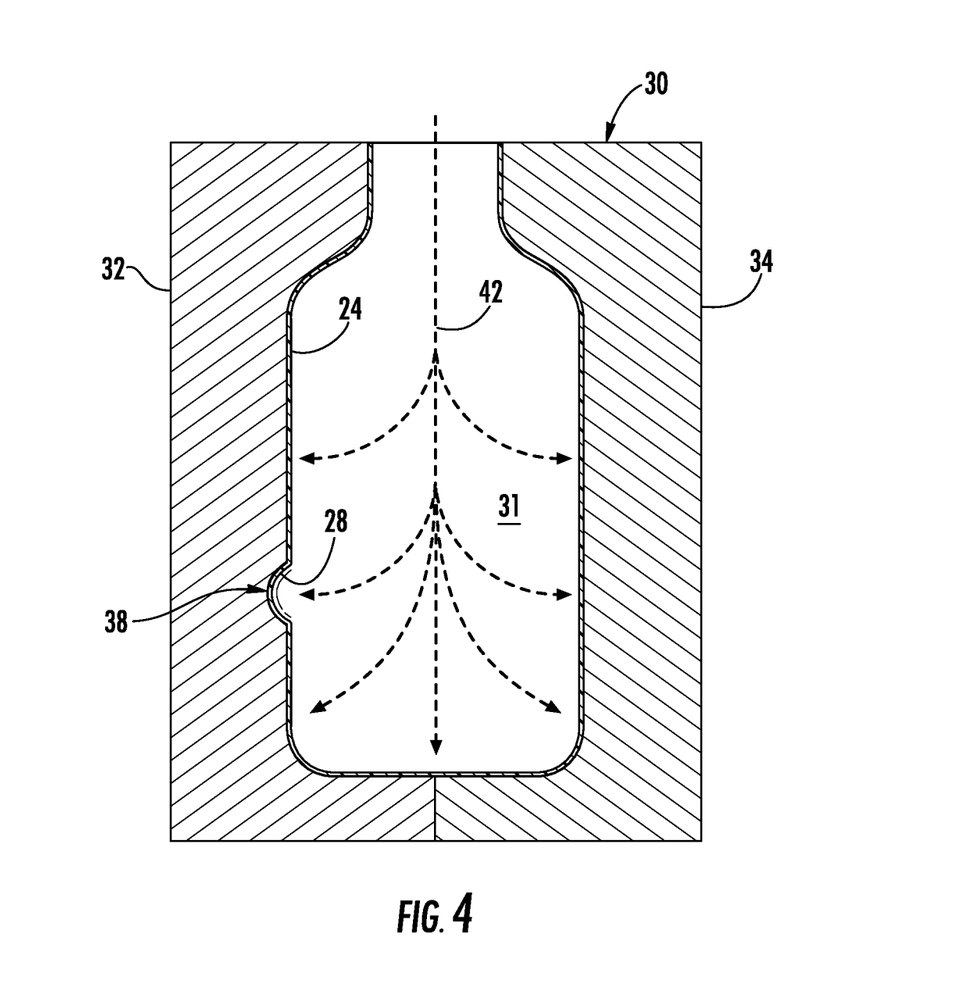
FIG. 4 is a cross section of a container in a mold illustrating a localized three dimensional decoration shaping according to the invention.

A force can be applied to the softened shaping region 28 which will shape the shaping region 28 into the desired three dimensional decoration. The force can be applied by any suitable means. In one aspect, a pressure differential is created between the interior of the container 31 and the shaping cavity 39 of the mold 30 to create a net outward force on the shaping region 28. The pressure differential for example can be applied by blowing a gas under pressure into the interior 31 of the container 24, as indicated by the broken lines 42 in FIG. 4. It is also possible to create the pressure differential by applying a vacuum to the shaping cavity space 39. The pressure differential should be sufficient to force the shaping region 28 when heated and pliable into the shaping cavity 39 and into contact with the cavity surface 38, as shown in FIG. 4. The force required to shape the shaping region 28 can also be applied by other means, for example mechanical means such as a mandrel. The force can also act inward from the exterior of the container 24 to shape a three dimensional decoration that is depressed relative to the surrounding container surface. The material of the shaping region 28 must retain its shape after the shaping force is removed. Cooling of the shaping region 28 can assist in shape retention. The force is applied so as to discretely shape the shaping region. The term discretely shape as used herein means that there is minimal surrounding deformation of areas of the container other than the shaping region. Minimal surrounding deformation can mean that these surrounding surfaces are stretched after the shaping process less than 10%, 9%, 8%, 7%, 6%, 5%, 4%, 3%, 2%, or 1% of the length of the pre-shaped surface.

Figure 5A:
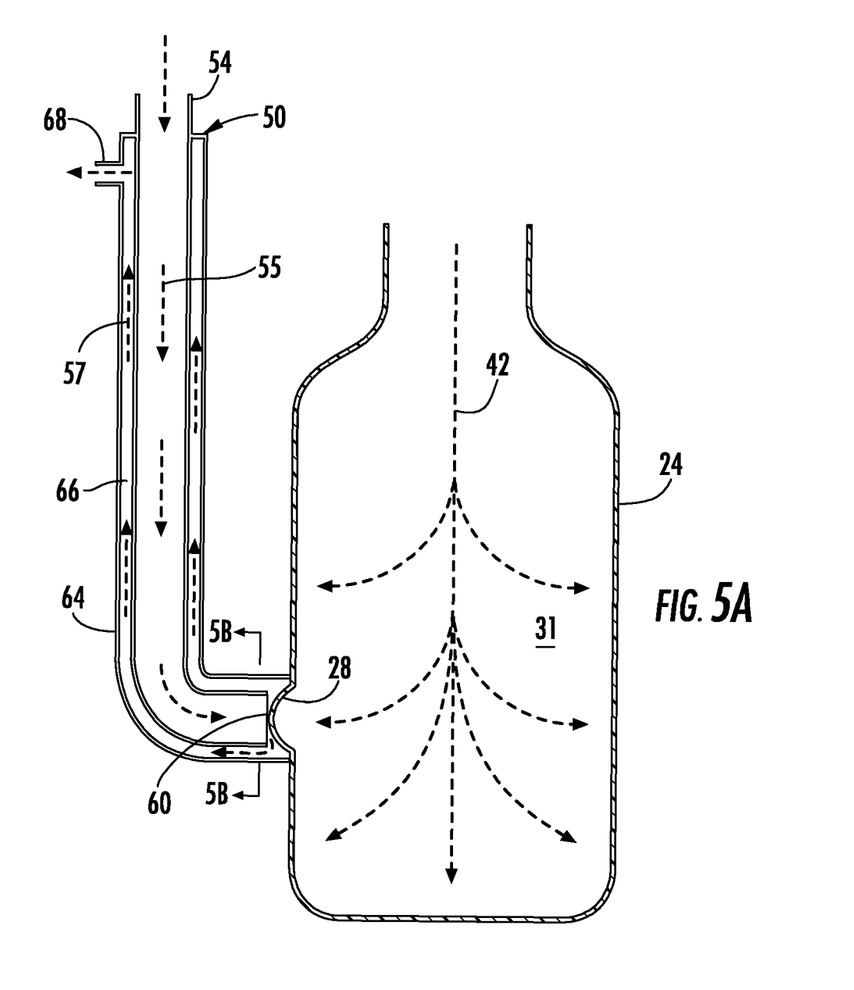
FIG. 5A is a schematic cross section of a molding system and a container according to an aspect of the invention.
Figure 5B:
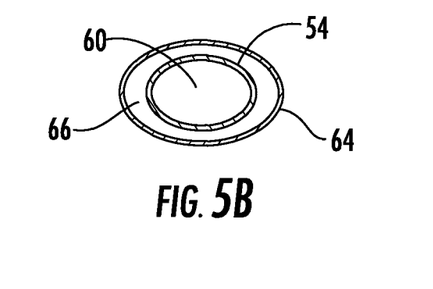
FIG. 5B is a schematic cross section taken along line 5B-5B in FIG. 5A.

The manner in which the heat is applied can vary. There is shown in FIGS. 5A-B a system 50 in which a heated gas 55 such as air flows through a conduit 54 and out an opening 60 to contact and heat the shaping region 28. Positive pressure can be applied as a gas stream 42 into the interior 31 of the container 24. The heated gas after contacting the shaping region 28 can be withdrawn as exhaust gas 57 through an exhaust conduit 64 having an interior space 66. In one aspect the conduit 54 and exhaust conduit 64 are concentric such that the interior space 66 is annular (FIG. 5B). The exhaust gas 57 can exit the exhaust conduit 64 through an exit opening 68.

Figure 6A:
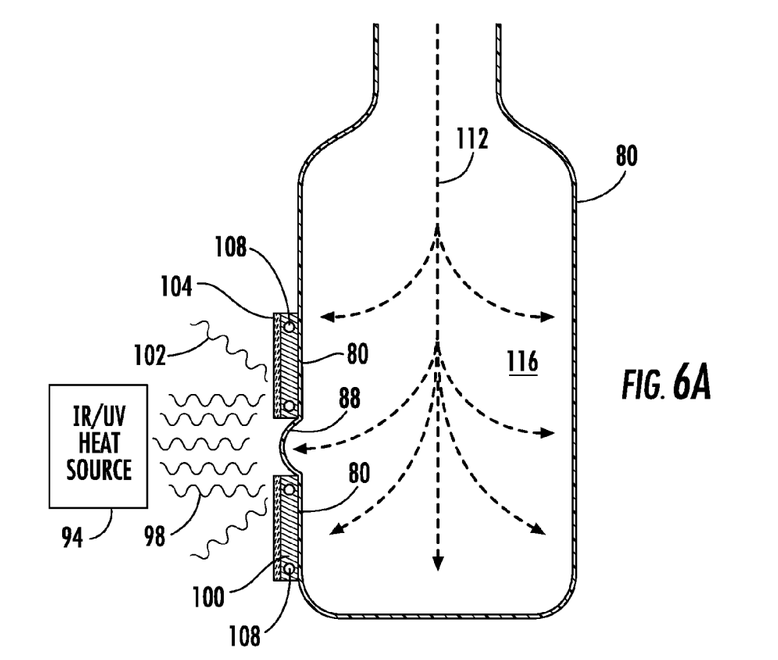
FIG. 6A is a schematic cross section of a system for creating a localized three dimensional decoration on a container.
Figure 6B:
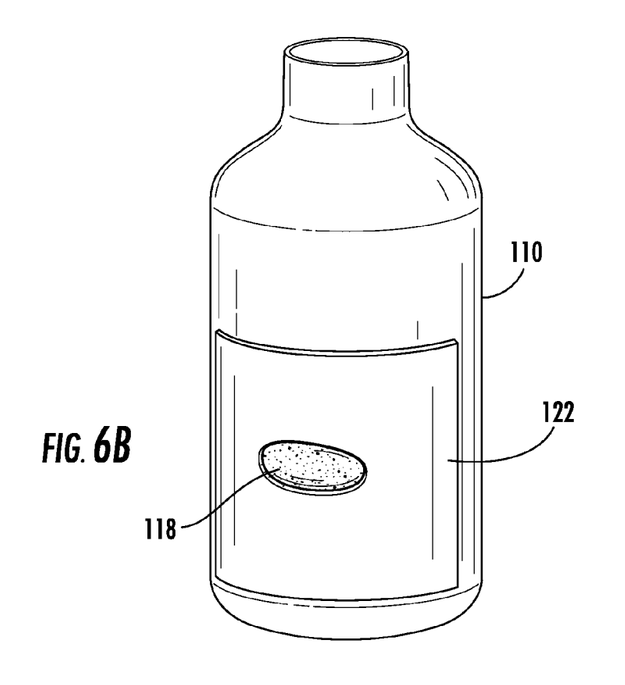
FIG. 6B is a perspective view of a container having surface features for creating a localized three dimensional decoration on the container.

There is shown in FIGS. 6A-B an alternative method of applying heat to the shaping region 28. The container 80 has a shaping region 88. An IR/UV heat source 94 is used to apply radiation 98 to the shaping region 88. A reflective surface 104 can be positioned around the shaping region 88 such that only the shaping region 88 is contacted by the radiation 98 and heated. Other radiation 102 not directed at the shaping region 88 is reflected as shown in FIG. 6A. The reflective surface can be provided on shielding pads 100. The shielding pads 100 can have cooling channels 108 with a suitable coolant such as a gas or liquid flowing there through for cooling the region of the container 80 around the shaping region 88 to avoid heating these regions. A pressured gas such as air 112 is forced into the interior 116 of the container 80 to provide the force necessary to shape the shaping region 88. In FIG. 6B there is shown a container 110 in which the reflective surface 122 surrounding the shaping region 88 is applied directly to the container 110 by any suitable process.

Figures 7A, 7B:
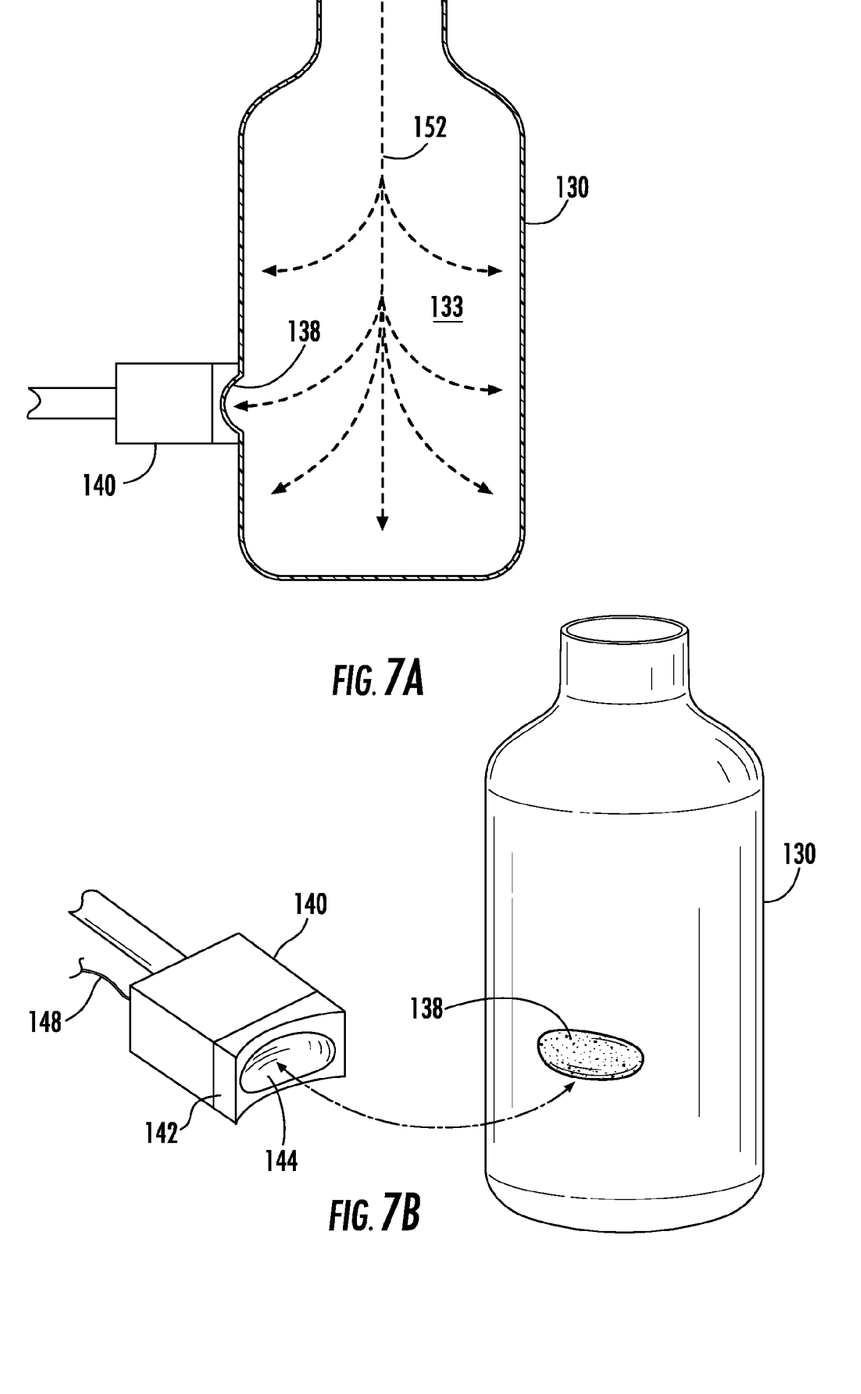
FIG. 7A is a schematic cross section of an alternative system for creating a localized three dimensional decoration on a container.
FIG. 7B is an exploded perspective of the system and container according to FIG. 7A.

There is shown in FIGS. 7A-B another system according to the invention in which the container 130 has a shaping region 138. A molding device 140 can be utilized to apply conductive heat directly to the shaping surface 138. The molding device 140 can have a heated portion 142 with a shaping cavity 144 formed therein. Heat is created at the heated portion 142 by suitable means such as resistive heating and pressure is applied to the interior 133 of the container 130 to force the shaping region 138 outward to take the shape of the shaping cavity 144. A thermocouple can be provided to sense and control the temperature of the heated surface portion 142 through a wired or wireless control line 148 connecting to a suitable processor.

Figure 8:
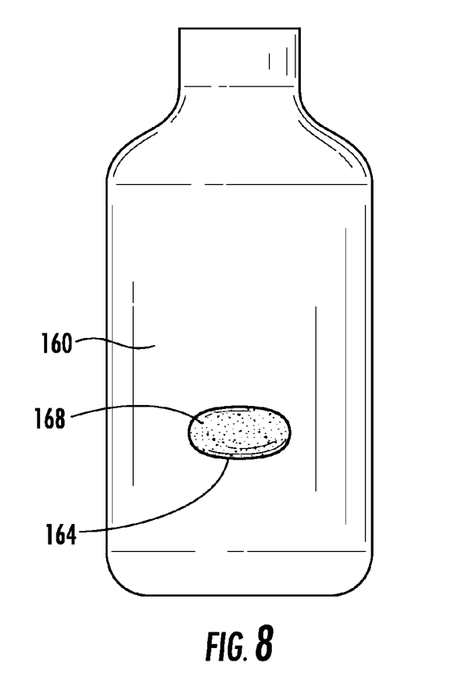
FIG. 8 is a front elevation of a container having a localized three dimensional decoration according to the invention.
Figure 9:
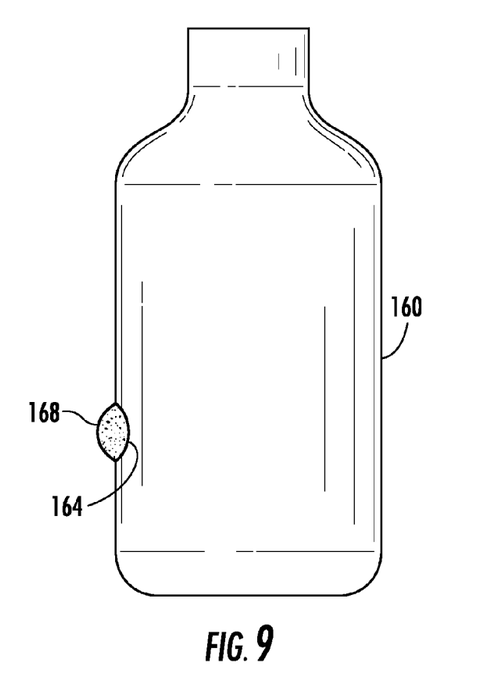
FIG. 9 is a side elevation.
Figure 10:
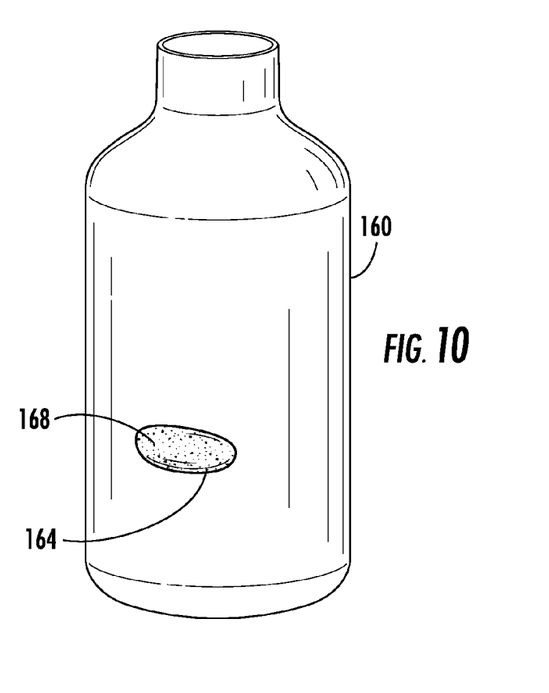
FIG. 10 is a perspective view.

There is shown in FIGS. 8-10 a container 160 according to the invention. The container 160 has a shaping region 164 which has been forced outward, as into a mold shaping cavity, to take the desired shape of the shaping cavity. The ink 168 is distributed over the three dimensional decoration.

Figure 11:
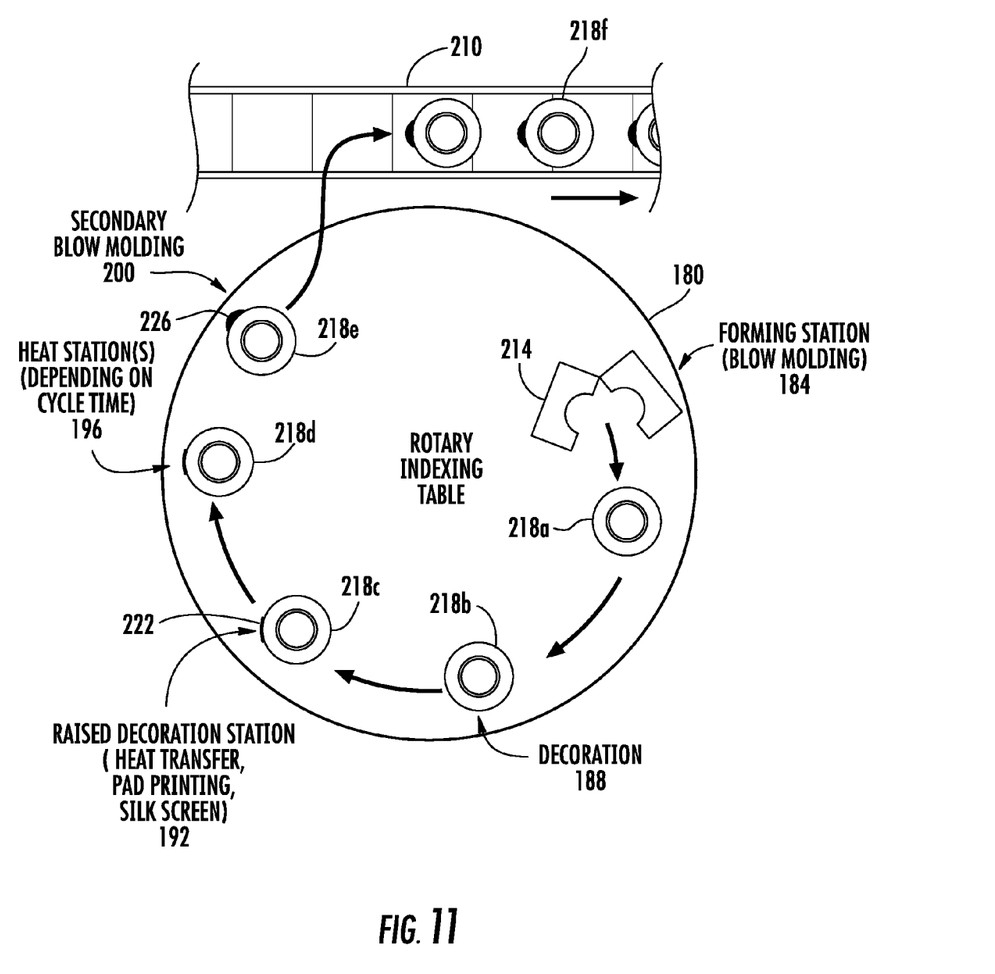
FIG. 11 is a schematic diagram illustrating a process for creating containers having a localized three dimensional decoration.

There is shown in FIG. 11 a process according to the invention. A rotary indexing table 180 can be provided. A container 218a is initially formed by any suitable process at a forming station 184, which can be a blow molding station with a mold 214, or any other suitable molding or container fabrication process. The container 218a is then sent to a container decoration station 188 where ink or other suitable decorations such as labels and the like can be applied to create an inked container 218b. The container 218b is then transferred to a three dimensional decoration station 192 where the three dimensional decoration ink is applied. It is possible that the bulk container inking station 188 could be combined with the three dimensional decoration station 192 to apply the container ink and the three dimensional decoration ink as a single step, or at a single location in subsequent steps. The ink is applied over the shaping region 222 to produce a container 218c. The container 218c is then transferred to a heating station 196 where the shaping region 222 is heated discretely to create a container 218d with a softened shaping region 222. The container 218d is then transferred to a shaping station 200 which can be a secondary blow molding step where pressure is applied to the interior of the container to raise the shaping region 222 into the desired shape 226 in a container 218e. The shaping process at the shaping station 200 can be any process which applies a force to the shaping region 222 to cause the decoration regions to take the desired three dimensional shape. The heating station 196 and the shaping station 200 could be combined to heat and shape the decoration region 22 in a single step, or at a single location in subsequent steps. The containers 218e are then transferred by suitable structure such as conveyor 210 to deliver finished containers 218f to the desired destination. It is possible that a device could be constructed such that two or more, or substantially all, of the above steps could be performed at a single physical container location, where the container would remain stationary while the machine inks, heats and shapes the decoration region of the container.

The foregoing description of the preferred embodiments of the invention has been presented for purposes of illustration. The invention is not limited to the embodiments disclosed. Modifications and variations to the disclosed embodiments are possible and within the scope of the invention.

I claim:

1. A process for producing containers, comprising the steps of:
    providing a container having a container wall with a shaping region the shaping region covering less than 75% of the total exterior surface area of the container, the shaping region comprising a thermoplastic material;
    applying an ink to the shaping region;
    discretely heating the shaping region to a shaping temperature;
    discretely shaping only the shaping region such that only the shaping region will to take a desired three dimensional shape.

2. The process of claim 1, wherein the ink is thermoplastic.

3. The process of claim 1, wherein the container is produced by a first molding process.

4. The process of claim 3, wherein the shaping step is a secondary molding process.

5. The process of claim 4, wherein at least one of the first molding process and the second molding process is a blow molding process.

6. The process of claim 1, wherein the shaping step comprises creating a pressure differential on opposing sides of the shaping region.

7. The process of claim 1, wherein the shaping step comprises applying a mechanical force to the shaping region.

8. The process of claim 1, wherein the heating step comprises conductive heating of the shaping region.

9. The process of claim 1, wherein the heating step comprises convective heating of the shaping region.

10. The process of claim 1, wherein the heating step comprises irradiative heating of the shaping region.

11. The process of claim 1, wherein the shaping of the shaping region into a three dimensional shape is a blow molding process.

\* \* \* \* \*